(No Model.)
S. H. HAAS.
VEHICLE COUPLING.
No. 403,427. Patented May 14, 1889.
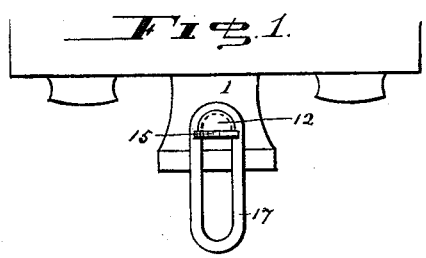
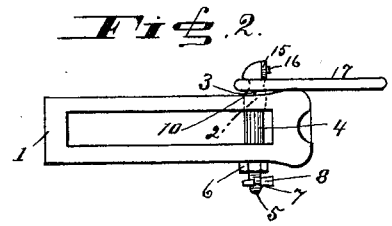
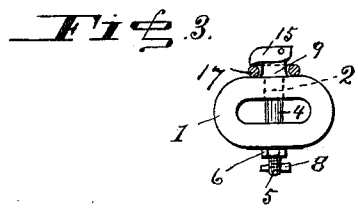
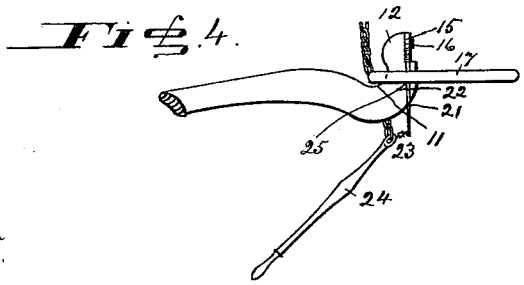
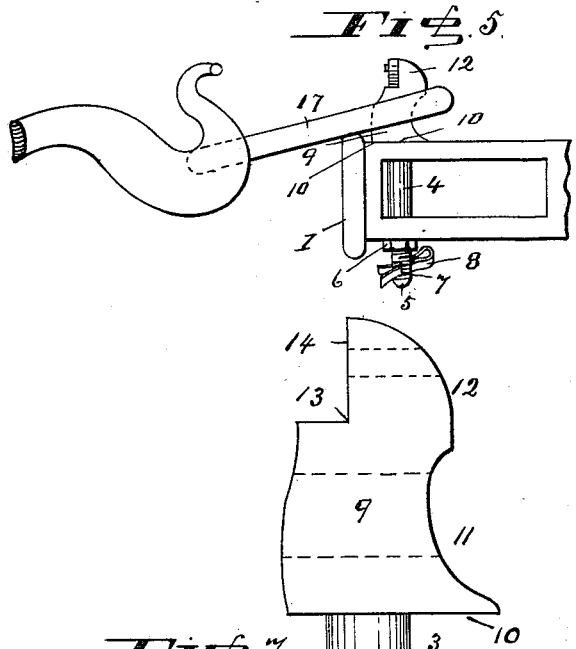
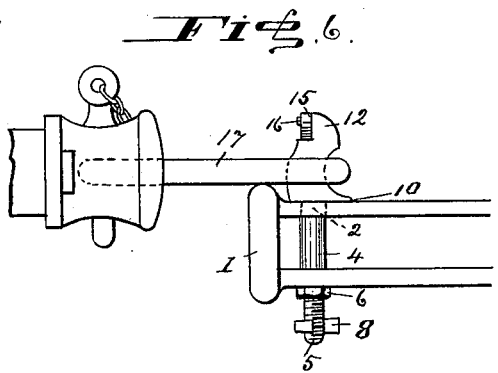
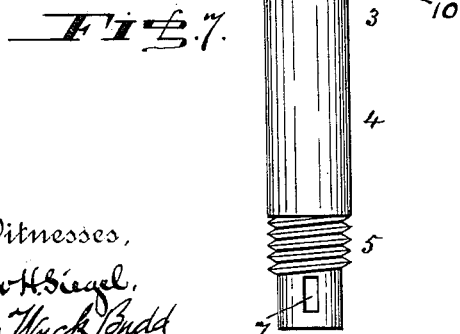
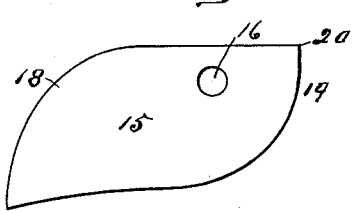
Witnesses,
Alex H. Siegel.
Van Wyck Budd
Samuel H. Haas Inventor,
By his Attorney Lloyd Wiegans

UNITED STATES PATENT OFFICE.

SAMUEL H. HAAS, OF PHILADELPHIA, PENNSYLVANIA.

VEHICLE-COUPLING.

SPECIFICATION forming part of Letters Patent No. 403,427, dated May 14, 1889.

Application filed June 25, 1888. Serial No. 278,187. (No model.)

*To all whom it may concern:*

Be it known that I, SAMUEL H. HAAS, a citizen of the United States, residing at Philadelphia, in the county of Philadelphia and State of Pennsylvania, have invented certain new and useful Improvements in Vehicle-Couplings; and I do hereby declare the following to be a sufficiently full, clear, and exact description thereof to enable others skilled in the art to make and use the said invention.

This invention relates to couplings for vehicles for purposes of traction, and is specially applicable to tramway and railway cars.

It has for its object facility of coupling and uncoupling, security against accidental uncoupling, the avoidance of injury to persons engaged in coupling such vehicles together, and easy and ready applicability to cars having draw-heads of the present usual construction.

The construction and operation of this invention are hereinafter fully and particularly described in this specification, and shown in the annexed drawings, in which—

Figure 1 shows a top view of the invention as applied to a car having the usual wrought-metal draw-head; Fig. 2, a side view thereof; Fig. 3, an end view thereof; Fig. 4, a side view of the invention as applied directly to the draw-bar of a railway-car. Fig. 5 shows the invention as coupled to an ordinary hook-and-link car-coupling. Fig. 6 shows the invention as coupled to an ordinary bull-nose draw-head; Fig. 7, a detached view of the pin or bolt, and Fig. 8 a detached view of the latch.

In Figs. 1, 2, 3, 5, and 6 a wrought-iron draw-head, 1, having the usual pin-hole, 2, has inserted in it a pin, 3, having a cylindric part, 4, fitting through the holes 2, and provided at the lower part with a screw-thread, 5, and nut 6, or a slot, 7, and key 8, as shown in Figs. 1, 2, 3, 5, and 6. The pin 3 has a head, 9, larger than the cylindric portion 4, forming a shoulder, 10, resting on the draw-head 1.

The head 9 is convex or rounded upon the corners in horizontal section, and is curved concavely in the direction of its length at the lower part, 11, toward the car to which it is applied, and above at the part marked 12 is curved convexly. A shoulder, 13, is formed near the top of the pin-head 9, having a flat vertical face, 14. Against the face 14 is placed a latch, 15, turning upon a pivot, 16, located to one side of the central vertical plane of the pin-head, and is made of such form as to be heavier at the longer end and to rest on bottom of the shoulder 13. The length of the latch 15 is so much greater than the space across the inside of the coupling-link 17 that when one inner side of the link 17 is against the side of the head 9 the other inner side of the link 17 will be beneath the end of the latch 15, and cannot be raised or disengaged from the pin-head 9 without first turning the longer end of the latch 15 upward. The longer end, 18, of the latch 15 is curved on the upper side, and the shorter end, 19, is curved on the lower side with an angle, 20, at the upper extremity. When the link 17 is placed on the pin-head 9, the corner 20 of the latch 15 is depressed by the weight of the link, and longer end of the latch 15 is raised, so that the link passes down around the pin-head 9 below the latch 15, which resumes its former horizontal position and prevents the link 17 from being jolted off. The part 19 of the latch 15 coming in contact with the link in a rising motion, holds the longer arm of the latch down. The relative length and form of the two arms of the latch 15 are such that a descending motion of the link causes a quicker rising movement of the long arm, thus permitting the link 17 to pass by it.

To couple cars by this apparatus, it is simply requisite to place the link 17 over the pin-head 9, and it falls into its place and is retained there by the latch 15.

An upright groove or tubular channel, 21, is formed in the pin-head 9, as shown in Fig. 4, in which is loosely fitted, so as to slide freely, a rod, 22, the lower end of which is connected to a chain, 23, or lever 24, or both, as shown in Fig. 4, by means of which it can be raised by a person at either the side or on top of the car. The upper end of the rod 21 is under the longer arm of the latch 15 and serves to raise it when it is desired to uncouple the car, a projection, 25, moving with the rod 21, serving to raise the link 17.

As shown in Fig. 5, a draw-head provided with my improved pin engages the link of a hook-and-link draw-head such as is used on coal-trains; as shown in Fig. 6, the link 17 engages on the pin-head 9 and with the ordinary bull-nose or bell-mouthed draw used on freight-cars showing the general applicabilities of my invention to existing car-fixtures.

Having described my invention and the mode of operating the same, what I claim is—

1. An improved vehicle-coupling consisting of a vertical hooked pin provided with a pivotally-attached latch transverse to the direction of draft, having unequal arms, the longer one preponderating to retain it in horizontal position and curved at the ends, as shown and described, to automatically receive a coupling-link and prevent the disengagement thereof, substantially as set forth.

2. An improved vehicle-coupling consisting of a vertical hooked projection provided with a pivotally-attached latch placed transversely to the line of draft, having arms of unequal length, the longer one preponderating to retain it in horizontal position and curved at the ends, as shown and described, to automatically tilt and pass through a coupling-link and prevent the accidental disengagement thereof, combined with a tilting mechanism arranged to operate said latch from beneath for the purpose of disengaging the link, substantially as set forth.

3. An improved vehicle-coupling consisting of a vertical hooked projection provided with a pivotally-attached latch having arms of unequal length, the longer arm preponderating to retain it in horizontal position and curved at the ends, as shown and described, to automatically pass through a coupling-link and prevent disengagement thereof, combined with a tilting and lifting mechanism arranged to operate said latch and lift the coupling-link, substantially as set forth.

SAMUEL H. HAAS.

Witnesses:
J. DANIEL EBY,
ALEX. H. SIEGEL.